US007618172B2

(12) United States Patent
Oyama

(10) Patent No.: US 7,618,172 B2
(45) Date of Patent: Nov. 17, 2009

(54) VEHICLE LIGHT

(75) Inventor: Hiroo Oyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 334 days.

(21) Appl. No.: 11/608,132

(22) Filed: Dec. 7, 2006

(65) Prior Publication Data

US 2007/0127251 A1 Jun. 7, 2007

(30) Foreign Application Priority Data

Dec. 7, 2005 (JP) ............................ 2005-352881
Dec. 27, 2005 (JP) ............................ 2005-376132

(51) Int. Cl.
*F21V 7/00* (2006.01)
*B60Q 1/26* (2006.01)

(52) U.S. Cl. ....................... 362/517; 362/475; 362/509; 362/516; 362/540; 362/541

(58) Field of Classification Search ......... 362/297–298, 362/300–301, 307–308, 327, 330, 333, 337, 362/343, 475, 498–499, 514–517, 521–522, 362/538, 540–542
See application file for complete search history.

(56) References Cited

U.S. PATENT DOCUMENTS 3,532,871 A * 10/1970 Shipman ..................... 362/506
6,419,380 B2 * 7/2002 Oyama et al. ............... 362/517

FOREIGN PATENT DOCUMENTS

| | | |
|---|---|---|
| JP | 09219105 | 8/1997 |
| JP | 2000133011 | 5/2000 |
| JP | 2003281906 | 10/2003 |

* cited by examiner

*Primary Examiner*—Sharon E Payne
*Assistant Examiner*—Sean P Gramling
(74) *Attorney, Agent, or Firm*—Cermak Kenealy Vaidya & Nakajima LLP

(57) ABSTRACT

A vehicle light can include a light source, a reflector configured to reflect light emitted from the light source in an irradiation direction of a vehicle on which the vehicle light is mounted, and a diffusion plate for diffusion of light and which can irradiate light in the irradiation direction. In this configuration, the diffusion plate can be configured such that light emitted from the light source and light reflected by the reflector enter the diffusion plate and pass therethrough while being refracted. The light is emitted from the diffusion plate in the irradiation direction while being diffused. At the same time, light which is incident on the diffusion plate and is reflected by the diffusion plate is diffused and irradiated in the irradiation direction of the vehicle light. The end portion of the diffusion plate can be bent or curved so as to diffuse the light reflected by the diffusion plate.

23 Claims, 6 Drawing Sheets

VEHICLE LIGHT

BACKGROUND

This application claims the priority benefit under 35 U.S.C. § 119 of Japanese Patent Application No. 2005-352881 filed on Dec. 7, 2005, and Japanese Patent Application No. 2005-376132 filed on Dec. 27, 2005 which are hereby incorporated in their entirety by reference.

1. Field

The disclosed subject matter relates to a vehicle light such as a vehicle headlight, a vehicle auxiliary light, spot light, traffic light, and the like, having a diffusion plate for diffusing light. In particular, the disclosed subject matter relates to a vehicle light which can widen the diffusion angle of light that is irradiated in an emitting direction of the vehicle light, thereby improving the light utilization efficiency.

Furthermore, the disclosed subject matter relates to a vehicle light which can widen the diffusion angle of light being irradiated in an emitting direction of the vehicle light, thereby improving the light utilization efficiency in comparison with the case where only light passing through the diffusion plate and being refracted by the diffusion plate is irradiated in the emitting direction.

2. Description of the Related Art

FIG. 1 is a perspective view of a conventional vehicle light 100. Reference numeral 101 denotes a light source such as a filament coil for a light source, or a high light intensity part of a discharge lamp. Reference numeral 102 denotes a bulb containing the light source 101, and reference numeral 103 denotes a socket hole through which the bulb 102 is mounted. Reference numeral 104 denotes a reflector. The surface of the reflector 104 is formed as a single complex reflecting surface extending in the right and left direction. Another type of reflector for a vehicle headlight includes a conventional multi-reflector (not shown) having a plurality of reflecting surfaces. Before developing such a multi-reflector for a vehicle headlight, a revolved parabolic surface had been mainly adopted as the reflecting surface of a vehicle headlight.

In FIG. 1, reference numeral 105 denotes a cover lens or a front lens, and reference numeral 106 denotes a grouped lens composed of lens cuts arranged on the center part of the cover lens 105. The conventional vehicle light 100 as shown in FIG. 1 has a number of convex lens portions side by side serving as the grouped lens.

In the conventional vehicle light 100 shown in FIG. 1, light diffused in the right to left direction can be irradiated in front of the vehicle light 100. However, a light loss of typically 10 to 20% has occurred due to the provision of the grouped lens 106 that has lens cuts. In more detail, part of light incident on the lens cuts 106 is reflected by the incident surface of the lens cut 106 (surface on the light source 101 side) and the emitting surface (surface on the front side of the vehicle light 100), thereby returning the light back to the light source 101 side.

Furthermore, the conventional vehicle light 100 as shown in FIG. 1 has an acute lens cut in order to irradiate diffusion light with an angle of 30° or more with respect to the main optical axis of the light 100. In other words, it is necessary to increase the incident angle of light incident on the incident surface and the emitting surface of the grouped lens or lens cut 106. In this case, the ratio of reflected light returned back to the light source 101 side from the incident and emitting surfaces may increase. As a result, the ratio of light irradiated in the irradiation direction of the vehicle light 100 may decrease. Therefore, the light is attenuated and the diffused light with an angle of 30° or more with respect to the main optical axis of the light 100 may not increase, resulting in a darker vehicle light.

FIG. 2 shows an example of a lens cut which provides an adverse affect when an incident angle is made larger. In this lens cut of FIG. 2, the difference between the convex and concave portions is large. In this case, the incident angle of light incident on the incident surface and the emitting surface of the lens cut becomes larger. Accordingly, when passing through the incident surface and the emitting surface, the ratio of the reflected light may significantly increase with respect to the refracted light. In case of an extremely large incident angle, the light may be totally reflected. Namely, even when the vehicle light is designed to irradiate diffused light with an angular range of 40° to 50° with respect to the main optical axis of light (vertical direction in FIG. 2), the light irradiated in the irradiation direction of the vehicle light (lower side in FIG. 2) is not diffused and widespread, but is only attenuated. The refraction phenomenon in FIG. 2 can be described in accordance with Snell's law ($\sin \gamma / \sin i = 1/n$). In FIG. 2, symbol i and I' each denote an incident angle (=reflection angle), and symbol $\gamma$ is a refraction angle. $n_{air}$ (=1) is a refraction index of air and n ($\approx$1.6) is a refraction index of a material forming the lens cut.

Conventionally, vehicle lights with a diffusion plate used for diffusing light have been known. Examples of the diffusion plate include an auxiliary lens for diffusion, an inner lens, a transparent plate, and the like. More specifically, examples of this type of vehicle light includes those shown in FIGS. 4 and 7 of Japanese Patent Laid-Open Publication No. 2003-281906 (hereinafter referred to as a "Publication 1"), that shown in FIG. 4 of Japanese Patent Laid-Open Publication No. 2000-133011 (hereinafter referred to as a "Publication 2"), that shown in FIG. 1 of Japanese Patent Laid-Open Publication No. Hei 9-219105 (hereinafter referred to as a "Publication 3"), and the like, all of which are incorporated herein in their entirety by reference.

The vehicle light shown in Publication 1 may be configured such that the parabolic reflecting surface reflects light and the reflected light passes through an auxiliary lens for diffusion. Furthermore, the light which has passed through the diffusion auxiliary lens is refracted by the diffusion auxiliary lens to be horizontally diffused and irradiated in the irradiation direction of the vehicle light.

This reduces the light utilization efficiency. In addition to this, when the refracted light passing through the diffusion auxiliary lens is largely diffused, the refracted light may only be attenuated without large diffusion. Accordingly, it is difficult to sufficiently diffuse the light with large angles in the irradiation direction using the vehicle light in accordance with the technique of Publication 1.

The vehicle light disclosed in Publication 2 is configured so that the light from a light source is reflected by a reflector and the reflected light is allowed to pass through an inner lens. In this case, the reflected light by the incident surface (surface on the reflector side) and the emitting surface (surface on the front side of the vehicle light) of the inner lens is returned back to the reflector side, without utilizing the light in the irradiation direction. Namely, in the vehicle light disclosed in Publication 2, because the light reflected by the incident surface and the emitting surface of the inner lens are not irradiated in the irradiation direction, the light utilization efficiency may be reduced. In addition to this, when the refracted light passing through the inner lens is largely diffused, the refracted light may only be attenuated without large diffusion. Accordingly, it is difficult to sufficiently diffuse the light with large angles in the irradiation direction using the vehicle light in accordance with the technique of Publication 2.

The vehicle light disclosed in Publication 3 is configured so that the light from a light source is reflected by a parabolic reflector and the reflected light is allowed to pass through a transparent plate. In this case, the light that passes through the transparent plate is refracted by a condensing lens element of the transparent plate to be diffused.

Namely, in the vehicle light disclosed in Publication 3, the refracted light passing through the transparent plate is diffused by the condensing lens element of the transparent plate to be irradiated in the irradiation direction of the vehicle light. In this case, the light reflected by the incident surface (surface on the parabolic reflector side) and the emitting surface (surface on the front side of the vehicle light) of the transparent plate is returned back to the parabolic reflector side, without utilizing the light in the irradiation direction. Namely, in the vehicle light disclosed in Publication 3, the light reflected by the incident surface and the emitting surface of the transparent plate are not irradiated in the irradiation direction. This reduces the light utilization efficiency. In addition to this, when the refracted light passing through the transparent plate is largely diffused, the refracted light may only be attenuated without large diffusion. Accordingly, it is difficult to sufficiently diffuse the light with large angles in the irradiation direction using the vehicle light in accordance with the technique of Publication 3.

SUMMARY

Therefore, according to an aspect of the disclosed subject matter, a vehicle light can be provided which increases the diffusion angle of light to be irradiated in the emitting direction of the vehicle light. According to another aspect of the disclosed subject matter a vehicle light can be provided that has improved light utilization efficiency.

In particular, according to an aspect of the disclosed subject matter a vehicle light can be configured soas to realize an increase in the light diffusion angle of the diffusion light to be irradiated in the emitting direction of the vehicle light and to improve the light utilization efficiency in comparison with the case where the vehicle light irradiates only refracted light that previously passed through the diffusion plate in the emitting direction.

A vehicle light in accordance with an aspect of the disclosed subject matter can include a diffusion plate for diffusing light. In comparison with the case where no diffusion plate is provided, the vehicle light can irradiate light with sufficient diffusion angle in the emitting direction of the vehicle light. In this instance, the diffusion plate can be arranged such that the refracted light that passes through the diffusion plate is diffused by the diffusion plate to be irradiated in the emitting direction of the vehicle light. The light reflected by the diffusion plate is diffused by the diffusion plate to be irradiated in the emitting direction of the vehicle light. In other words, both the reflected light reflected by the incident surface and the emitting surface of the diffusion plate and the refracted light that has passed through the diffusion plate and has been emitted from the emitting surface are irradiated in the emitting direction.

In this way, the light diffusion angle of the diffusion light to be irradiated in the emitting direction of the vehicle light can be increased, and the light utilization efficiency can be improved, in comparison with the case where the vehicle light irradiates only refracted light that passes through the diffusion plate in the irradiation direction.

The end portion of the diffusion plate may be bent or curved. In this manner, the light reflected by the diffusion plate can be diffused. Alternatively, the end portion of the diffusion plate may not be bent or curved, but may extend linearly. Namely, the linearly extending diffusion plate can irradiate both the refracted light and the reflected light therefrom in the emitting direction. This can diffuse the light to be irradiated in the emitting direction much more than the case where only the refracted light from the diffusion plate is irradiated in the emitting direction.

In an exemplary embodiment, the incident surface of the diffusion plate is subjected to a corrugating process. Namely, the incident surface is corrugated. This can further diffuse the light reflected by the incident surface of the diffusion plate. Furthermore, the emitting surface thereof may be corrugated.

In another exemplary embodiment, the diffusion plate may be arranged such that the incident angle of light incident on the incident surface of the diffusion plate is, for example, approximately 25° or more. In other words, the diffusion plate may be arranged such that light is not incident on the incident surface at an angle less than 25°. This is because the light incident on the incident surface at an angle less than 25° may be reflected and returned back toward the light source side, which is not effectively utilized for irradiation.

In another exemplary embodiment, both the incident surface and the emitting surface of the diffusion plate may be corrugated. In this instance, the diffusion angle of the refracted light irradiated in the irradiation direction can be increased in comparison with the case where any one of the incident and emitting surfaces is corrugated.

The vehicle light according to the disclosed subject matter may include a first reflector configured to reflect light from the light source to the diffusion plate. In this instance, the horizontal cross-sectional curve of the first reflector may be an elliptic arc having a first focus and a second focus, wherein the light source is located on or in the vicinity of the first focus, and the second focus is located between the light source and the diffusion plate. Namely, the first reflector is configured such that the light reflected by the first reflector is made to intersect before the diffusion plate. In this way, the refracted light having passed through the diffusion plate and the reflected light reflected by the diffusion plate can be diffused with larger angles and irradiated in the irradiation direction in comparison with the case where the light reflected by the first reflector is not crossed before the diffusion plate.

In an exemplary embodiment, the vertical cross-sectional curve of the first reflector may be an elliptic arc having a first focus and a second focus, wherein the light source is located on or in the vicinity of the first focus, and the second focus is located approximately 10 to 40 m away from the first focus.

The vehicle light according to the disclosed subject matter may include a second reflector having right and left parabolic reflecting surfaces between which the first reflector is interposed. The second reflector can collect light to irradiate it in the irradiation direction, and at the same time, can irradiate the light diffused by the first reflector and the diffusion plate in the irradiation direction. Furthermore, the end portion of the diffusion plate can be arranged at the boundary portion between the first reflector and one of the parabolic reflecting surfaces of the second reflector. A through hole can be formed in the diffusion plate. The light emitted from the light source passes through the through hole to reach one of the parabolic reflecting surfaces of the second reflector. This can avoid diffusing, by the diffusion plate, light from the light source to the second reflector. Accordingly, the light gathered by the right and left reflecting surfaces of the second reflector can be irradiated in the irradiation direction.

The vehicle light according to the disclosed subject matter may be designed to extend from the front surface to the side face of the vehicle body.

In another exemplary embodiment, the vehicle light further includes a third reflector configured to reflect the light emitted from the light source and a fourth reflector configured to reflect the light reflected by the third reflector in the irradiation direction. In this configuration, the third reflector is composed of a third center-side elliptic reflector (which is disposed on a center side of the vehicle light) and a third side-face elliptic reflector (which is disposed on a side-face side of the vehicle light). The third center-side elliptic reflector can have a first focus in the vicinity of which the light source is disposed. Also, the third side-face elliptic reflector can include a first focus in the vicinity of which the light source is disposed. Furthermore, the fourth reflector can be composed of a fourth center-side reflector (which is disposed on the center side of the vehicle light) and a fourth side-face reflector (which is disposed on the side-face side of the vehicle light). In this instance, the average distance from the second focus of the third center-side elliptic reflector to the reflecting surface of the fourth side-face reflector is made approximately 1.5 to 2 times as long as the average distance from the second focus of the third side-face reflector to the reflecting surface of the fourth center-side reflector.

In an alternative exemplary embodiment, the area of the reflecting surface of the fourth side-face reflector can be approximately two to three times as large as the area of the reflecting surface of the fourth center-side reflector. In other words, the reflecting surface of the fourth side-face reflector is larger and deeper than the reflecting surface of the fourth center-side reflector.

In an exemplary embodiment, the light converging power of the fourth side-face reflector can be larger than that of the fourth center-side reflector. In other words, the light distribution pattern can be formed by converging light by means of the side-face reflector. As compared with the case where the light distribution pattern is formed by the center-side reflector, it is possible to efficiently form a light distribution pattern with high distance visibility as well as with a large intensity of converged light.

According to an alternative definition, the diffusion degree of the reflecting surface of the fourth center-side reflector can be larger than that of the fourth side-face reflector. Namely, the fourth center-side reflector can diffuse light horizontally for illumination. As compared with the case where the side-face reflector disposed on the deeper side diffuses the light for illumination, it is possible to make the diffusion angle of light larger.

In another exemplary embodiment, the vehicle light according to the disclosed subject matter can include a fifth elliptic reflector for reflecting the light emitted from the light source, and which is arranged behind the light source. Furthermore, a first through hole through which the light reflected from the fifth elliptic reflector passes to reach the diffusion plate can be formed between the third center-side elliptic reflector and the third side-face elliptic reflector. In this configuration, the light emitted from the light source rearward is reflected by the fifth elliptic reflector, and then is allowed to pass through the first through hole to reach the diffusion plate. Accordingly, the light utilization efficiency can be improved and the intensity of the irradiation light can be strengthened.

In an exemplary embodiment, the diffusion plate and the third side-face elliptic reflector can be formed as an integral single unit. This can reduce the number of parts and can also suppress the manufacturing cost.

BRIEF DESCRIPTION OF THE DRAWINGS

These and other characteristics, features, and advantages of the disclosed subject matter will become clear from the following description with reference to the accompanying drawings, wherein.

DETAILED DESCRIPTION OF EXEMPLARY EMBODIMENTS

The term "left (or left side)" used herein refers to the left side of the vehicle when seen from the front of the vehicle and at the passenger side, and the term "right (or right side)" refers to the right side of the vehicle when seen from the front of the vehicle.

It should be appreciated that the disclosed subject matter can be applied to a vehicle light such as a vehicle headlight, a vehicle auxiliary light, spot light, traffic lights, and the like. Hereinafter, a headlight may be exemplified in order to describe the disclosed subject matter.

Figure 1:
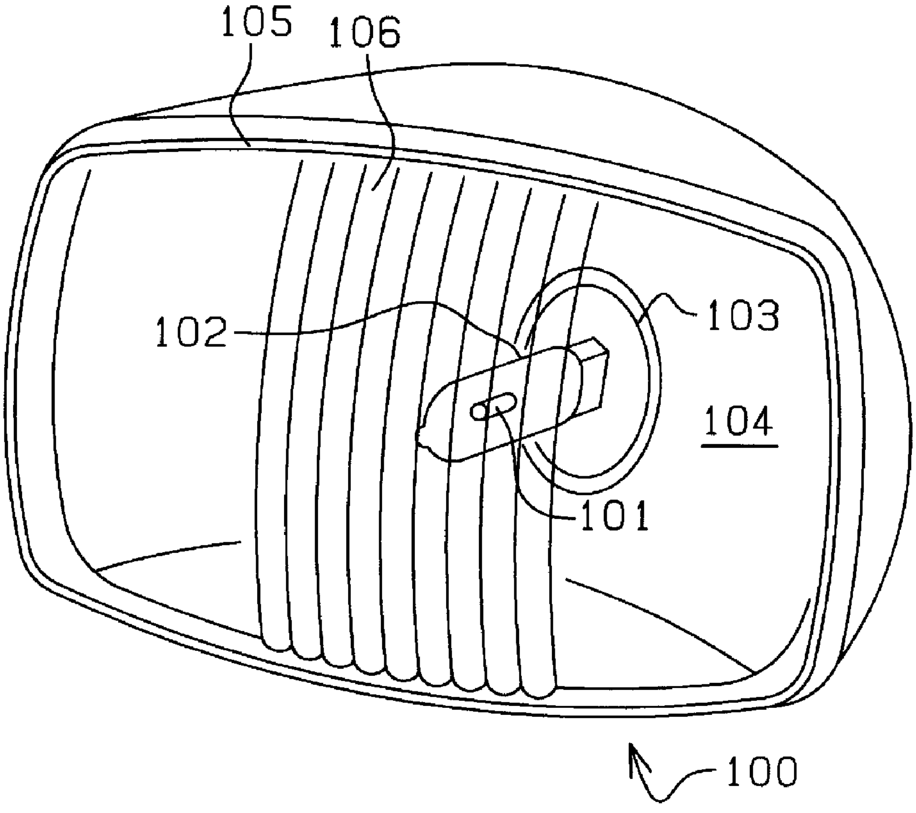
Fig. 1 Conventional Art
FIG. 1 is a perspective view of a conventional vehicle headlight.
Figure 2:
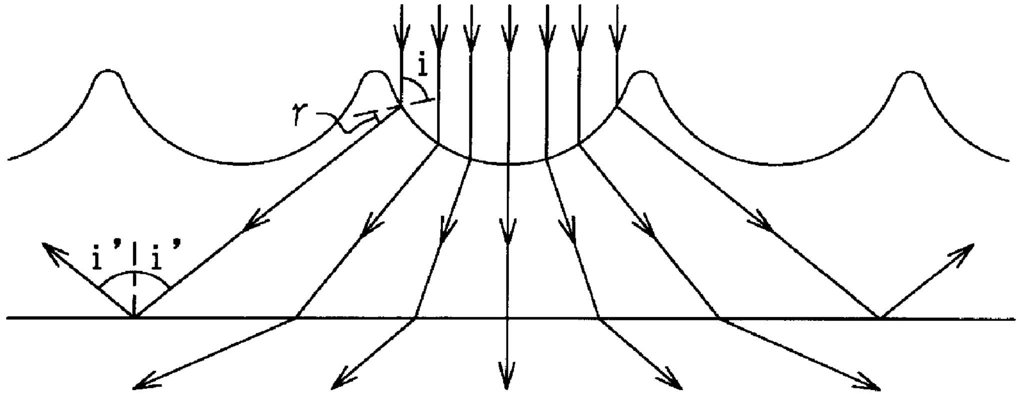
Fig. 2 Conventional Art
FIG. 2 is a diagram illustrating the undesirable affect when an incident angle of light is large.
Figure 3:
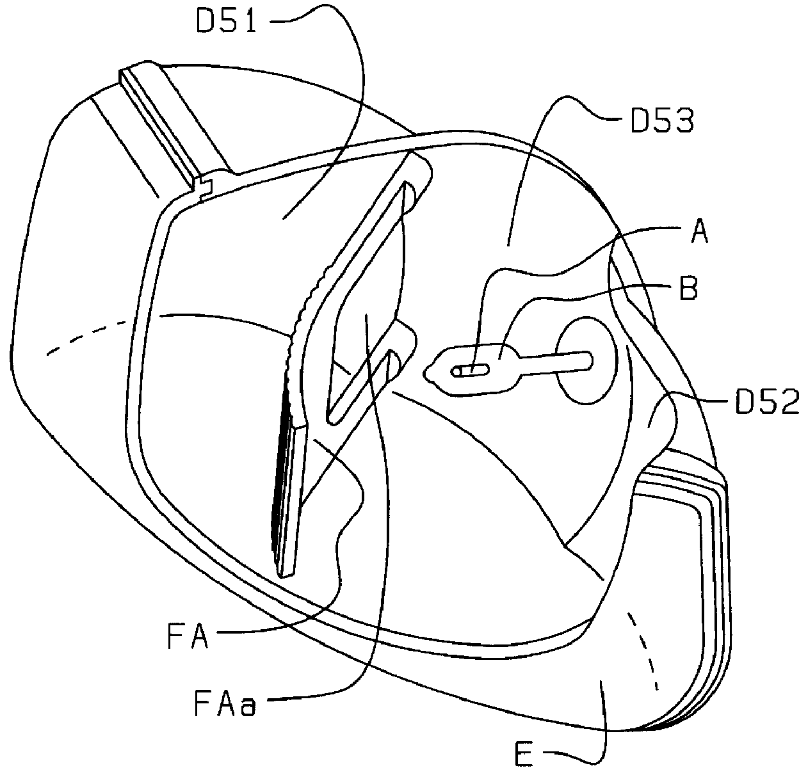
FIG. 3 is a perspective view showing an embodiments of a vehicle light made in accordance with principles of the disclosed subject matter wherein the light is partially cut.
Figure 4:
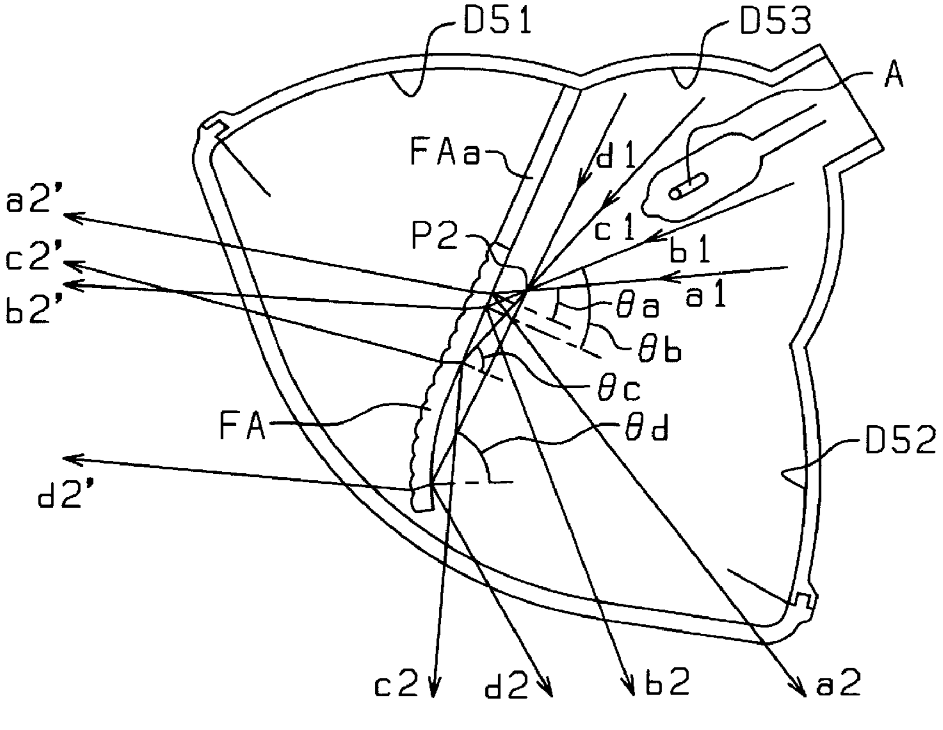
FIG. 4 is a diagram showing light paths within a horizontal plane of the vehicle light of FIG. 3.
Figure 5:
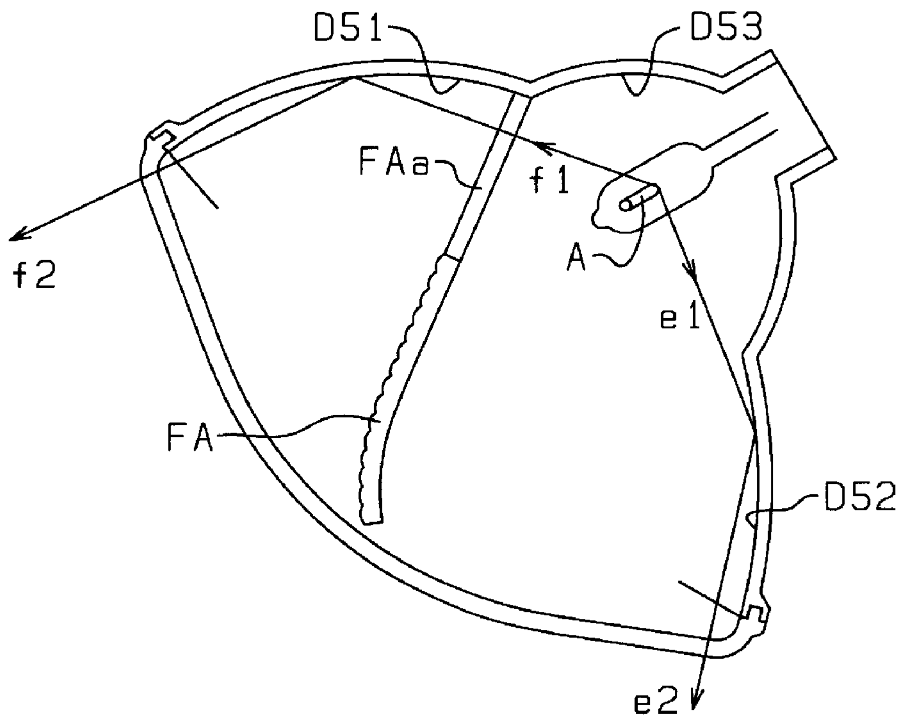
FIG. 5 is a diagram showing other light paths within a horizontal plane of the vehicle light of FIG. 3.

An exemplary embodiment of the disclosed subject matter will be described in detail with reference to FIG. 3, which is a perspective view of an embodiment of a vehicle light made in accordance with principles of the disclosed subject matter, and which is partially cut. In particular, FIG. 3 is a perspective view of a vehicle headlight for a right-side traffic system, as seen from above and from the front. FIGS. 4 and 5 are diagrams showing several light paths within a horizontal plane of the vehicle light of FIG. 3. In particular, the lower side in FIGS. 3 to 5 corresponds to the front side of a vehicle and the upper side thereof corresponds to the rear side of the vehicle. In addition, the left side thereof corresponds to the right side (right side surface) of the vehicle and the right side thereof corresponds to the left side (center side) of the vehicle. The vehicle headlight shown in FIGS. 3 to 5 is designed to extend from the front surface to the right side face of the vehicle.

In FIGS. 3 to 5, symbol A denotes a light source. Symbol B denotes a bulb incorporating the light source A. The main optical axis (center axis) of the light source A can be directed to the front right side of the vehicle (lower left side in FIGS. 4 and 5) such that the main optical axis (center axis) of the light source A forms 45°±15° with respect to the front-to-rear direction (up and down direction in FIGS. 4 and 5) of the vehicle.

Symbol D53 denotes a reflector configured to reflect light emitted from the light source A. Symbol D51 denotes a reflector configured to reflect the converged light to the right front side of the vehicle (left lower side in FIG. 5). The reflector D1 is arranged on the right side of the light source A (right side face of the vehicle, also on the left side in FIG. 5). Symbol D52 denotes a reflector configured to reflect the converged light to the front side of the vehicle (lower side in FIG. 5). The reflector D52 is arranged on the left front side of the light source A (front and center side of the vehicle, also on the right lower side in FIG. 5).

In the exemplary embodiment as shown in FIGS. 3 to 5, the reflector D51 is composed of a revolved parabolic surface or similar parabolic surface, and converges the light from the light source A and reflects the light toward the front right side of the vehicle (lower left side in FIG. 5). Furthermore, the reflector D52 is composed of a revolved parabolic surface or similar parabolic surface, and converges the light from the light source A and reflects the light toward the front side of the vehicle (lower side in FIG. 5). In the exemplary embodiment as shown in FIG. 4, the horizontal cross section of the reflecting surface of the reflector D53 is depicted as an elliptic arc. The reflector D53 is configured so that the light source A is located at or in the vicinity of the first focus of the elliptic arc. Within the horizontal plane, the light reflected from the reflector D53 is converged on the second focus P2 of the elliptic arc, and then diffused. Furthermore, the reflecting surface of the reflector D53 has an elliptic arc in a vertical cross section that can be similar in shape to a parabola. The reflector D53 is configured so that the light source A is located at or in the vicinity of the first focus of the elliptic arc and the second focus thereof is located 10 m to 40 m away from the light source A in the forward direction (the lower side in FIG. 4). Namely, the light reflected by the reflector D53 is converged 10 to 40 m away in front of the light source (lower side in FIG. 4) within the vertical plane.

Symbol E in FIGS. 3 and 4 denotes a cover lens or a front lens. Symbol FA denotes a diffusion plate. The diffusion plate FA may be made of, for example, a transparent corrugated plate having a given light transmittance. The diffusion plate FA can diffuse the light passing through the second focus P2 (see FIG. 4), in right and left directions. Namely, the diffusion plate FA is formed of a transparent material for light from the second focus P2 to pass therethrough. In addition to this, the diffusion plate FA has a convex lens like cross section (see FIG. 4) in order to diffuse light which passes through the diffusion plate FA. Alternatively, the diffusion plate FA may be made of a translucent plate, or a plate member without lens cut portions formed on the surface. In the exemplary embodiment as shown in FIG. 3, the diffusion plate FA extends from the boundary portion between the reflectors D51 and D53 to the front side (lower side in FIG. 3), and is fixed to the reflectors D51 and D53 by, for example, screws or other known attachment structures or adhesive means. It should be noted that symbol FA a denotes a through hole formed in the diffusion plate in order for the light emitted from the light source A to pass therethrough and reach the reflecting surface of the reflector D51.

Figure 6:
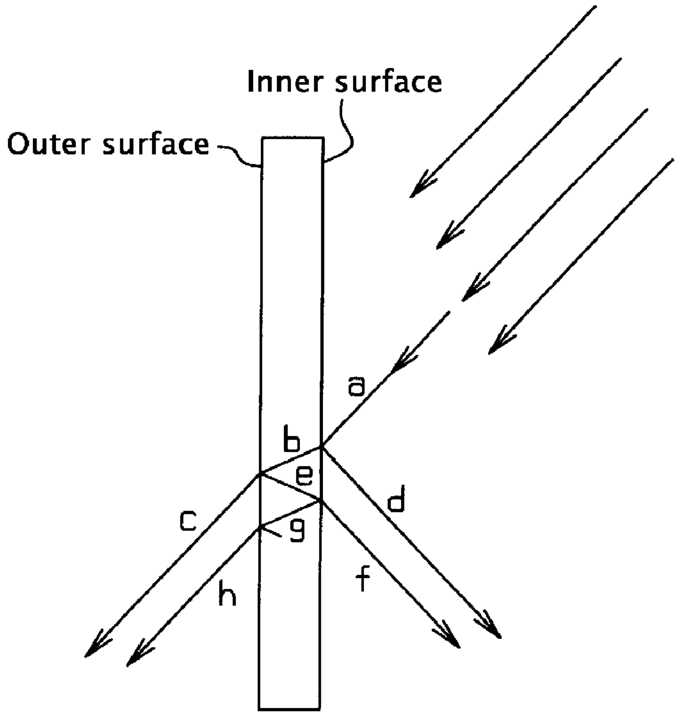
FIG. 6 is a diagram illustrating functions and effects of the diffusion plate FA of FIG. 3.
Figure 7:
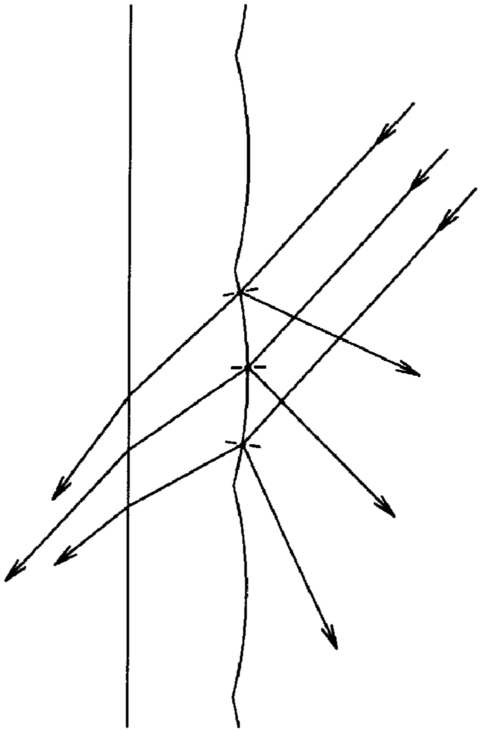
FIG. 7 is another diagram illustrating functions and effects of the diffusion plate FA of FIG. 3.
Figure 8:
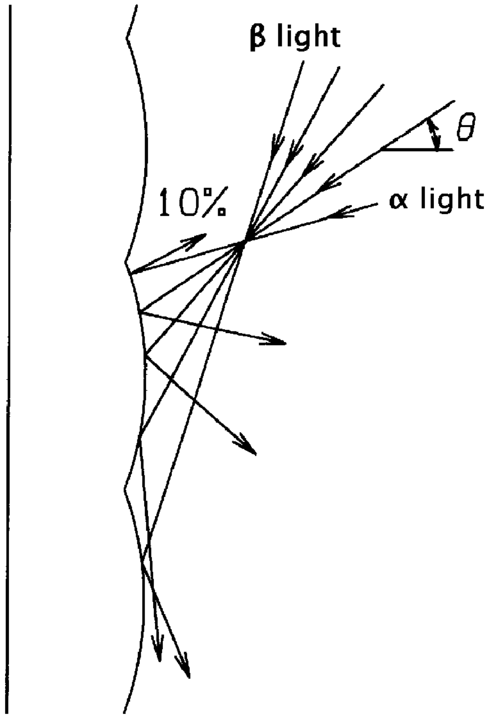
FIG. 8 is still another diagram illustrating functions and effects of the diffusion plate FA of FIG. 3.

FIGS. 6 to 9 are exemplary drawings showing functions and effects of the diffusion plate FA. In particular, FIG. 6 shows parallel light being incident on a transparent parallel plate, light being reflected by the transparent parallel plate, and light passing through the transparent parallel plate. FIG. 7 shows a transparent parallel plate with small (thin) convex portions formed in the inner surface (incident surface) of the transparent parallel plate shown in FIG. 6, and serving as a diffusion plate. In this figure, parallel light is allowed to be incident on the diffusion plate. FIG. 8 shows a state wherein diffused light is allowed to be incident on the diffusion plate shown in FIG. 7. FIG. 8 shows a transparent parallel plate with small (thin) convex portions formed in the outer surface (emitting surface) of the transparent parallel plate, serving as the diffusion plate. In this figure, diffused light is allowed to be incident on the diffusion plate.

As shown in FIG. 6, approximately 90% of the incident light a enters the transparent parallel plate, while being refracted, so as to become light b, and approximately 10% of the incident light a is reflected by the inner surface (incident surface) so as to become inner reflected light d. The light b reaches the outer surface (emitting surface) to be divided into transmitted light c and reflected light e. The reflected light e reaches the inner surface (incident surface) to be divided into light f and reflected light g. Then, part of the reflected light g that has reached the outer surface (emitting surface) passes through the outer surface to become transmitted light h.

The transparent parallel plate shown in FIG. 6 can be a completely transparent body. If the theoretical absorbance is substantially zero and the light a is 100%, the transparent light c is approximately 81% of the light a, the reflected light d is approximately 10% of the light a, the light f is approximately 8% of the light a, and the transparent light h is equal to, or less than, 1% of the light a. In other words, the total amount of light emitted from both the surfaces of the transparent parallel plate (c+d+f +h) is equal to, or more than, 99% of the incident light. Accordingly, if the surface reflectance has a different value, when the absorbance of the material of the transparent parallel plate is assumed to be substantially zero, the total amount of obtained light is 99% or more of the incident light.

As shown in FIG. 7, the surface of the convex portion of the incident surface of the diffusion plate (right side in FIG. 7) is configured to be similar to a convex mirror, and the resulting diffusion plate can generate diffusion light reflected by the incident surface of the convex portion of the diffusion plate. The light incident on the incident surface is converged once due to the convex like-lens function of the convex portion and travels through the diffusion plate, and then is refracted when being emitted from the outer surface (emitting surface) of the diffusion plate and then is diffused to the outside. When the surface is composed of a convex portion which is slightly warped, the total amount of obtained light is 99% or more of the incident light, which is similar to the case shown in FIG. 6. When the surface is composed of concave portions instead of convex portions (not shown in the drawings), the light which is reflected by the concave surface is once converged and then diffused to become diffusion light with the total amount of 99% or more, similar to the case shown in FIG. 7. Thus, the light received directly from the light source and/or the light reflected by the reflector is first incident on the incident surface of the diffusion plate. At this time, the light is converged by the convex lens-like function of the surface shape of the diffusion plate. Then, the light passes through the diffusion plate and is emitted from the emitting surface of the diffusion plate. At this time, the light is refracted by the interface of the emitting surface and outside space (air). This means both the light reflected by the incident surface and the light passing through the incident surface are diffused.

In the case shown in FIG. 8, consider that the inner surface (incident surface) of the transparent parallel plate has shallow (thin) convex portions. When diffused light is allowed to be incident on the diffusion plate, β light shown in FIG. 8 is reflected in a right lower direction. On the other hand, α light may be reflected in a right upper direction in some cases. In this case, loss of light occurs and the total amount of light may be decreased.

Figure 9:
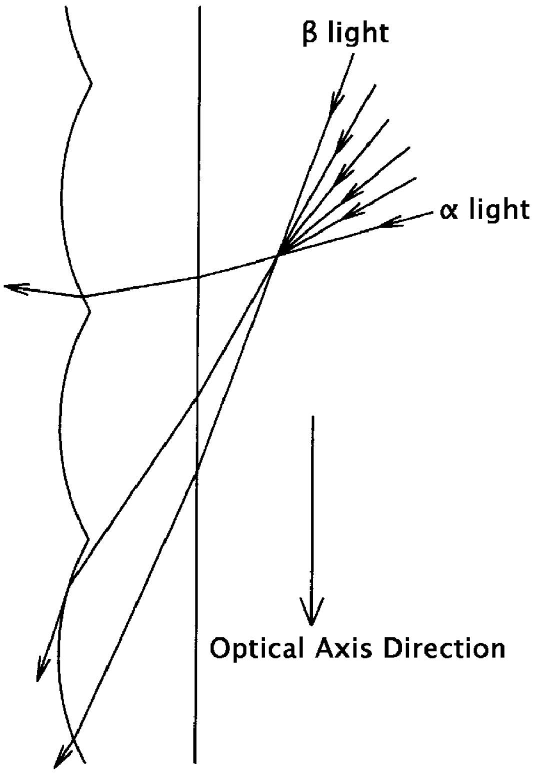
FIG. 9 is yet another diagram illustrating functions and effects of the diffusion plate FA of FIG. 3.

As shown in FIG. 9, when the outer surface (emitting surface) of the transparent parallel plate has shallow (thin) convex portions, part of the diffused light that is incident on the diffusion plate may not be returned toward the right upper direction in FIG. 9. On the contrary, the light that passes through the diffusion plate may travel forward to the left upper side as shown in FIG. 9. In the case where a vehicle light is arranged so as to extend from the front face to the right side of the vehicle body as shown in FIGS. 3 and 5, if the light that passes through the diffusion plate FA travels forward to the left upper side as shown in FIG. 4, the light is irradiated in the right direction and may be utilized effectively to compensate the light for use in driving. In other words, the light traveling toward the left upper side in FIG. 4 may not be lost.

In the exemplary embodiment shown in FIG. 4, part of light al from the reflector D53 is allowed to pass through the diffusion plate FA and be diffused by the corrugated portion of the diffusion plate FA, thereby being irradiated in the right side of the vehicle body as refracted light a2' (left side in FIG. 4). Another part of the light al is reflected by the diffusion plate FA to be irradiated to the center side and front side of the vehicle body as reflected light a2 (right lower side in FIG. 4). Namely, the light al from the reflector D53 is converted into reflected light a2 and refracted light a2', both of which are diffused.

In a similar manner as above, as shown in FIG. 4, part of light b1 from the reflector D53 is allowed to pass through the diffusion plate FA and be diffused by the corrugated portion of the diffusion plate FA, thereby being irradiated in the right side of the vehicle body as refracted light b2' (left side in FIG. 4). Another part of the light b1 is reflected by the diffusion plate FA to be irradiated to the center side and front side of the vehicle body as reflected light b2 (right lower side in FIG. 4). Namely, the light b1 from the reflector D53 is converted into reflected light b2 and refracted light b2', both of which are diffused.

Furthermore, as shown in FIG. 4, part of light c1 from the reflector D53 is allowed to pass through the diffusion plate FA and be diffused by the corrugated portion of the diffusion plate FA, thereby being irradiated in the right side of the vehicle body as refracted light c2' (left side in FIG. 4). Another part of the light c1 is reflected by the diffusion plate FA to be irradiated to the front side of the vehicle body as reflected light c2 (lower side in FIG. 4). Namely, the light c1 from the reflector D53 is converted into reflected light c2 and refracted light c2', both of which are diffused.

In a similar manner as above, as shown in FIG. 4, part of light d1 from the reflector D53 is allowed to pass through the diffusion plate FA and be diffused by the corrugated portion of the diffusion plate FA, thereby being irradiated in the right side of the vehicle body as refracted light d2' (left side in FIG. 4). Another part of the light d1 is reflected by the diffusion plate FA to be irradiated to the center side and front side of the vehicle body as reflected light d2 (right lower side in FIG. 4). Namely, the light d1 from the reflector D53 is converted into reflected light d2 and refracted light d2', both of which are diffused.

In other words, in the exemplary embodiment as shown in FIG. 4, a portion of light is reflected by the incident surface (right side surface in the figure) and the emitting surface (left side surface in the figure) of the diffusion plate FA and another portion of light is incident on the diffusion plate FA and passes therethrough to be emitted from the emitting surface of the diffusion plate FA. The resulting reflected light a2, b2, c2, and d2 and refracted light a2', b2', c2', and d2' are effectively utilized as irradiation light. Accordingly, the exemplary embodiment can increase the diffusion angle of light to be irradiated and improve the light utilization efficiency in comparison with the case where only the refracted light that passes through the diffusion plate is utilized for irradiation.

In the exemplary embodiment as shown in FIG. 5, light e1 emitted from the light source A is reflected by the reflector D52, thereby being irradiated to the front side of the vehicle body (lower side in FIG. 5). In particular, the emitted light from the light source A is converged by the parabolic reflector D52 to be irradiated to the front side of the vehicle body. Furthermore, light f1 emitted from the light source A passes through the through hole FAa of the diffusion plate FA. Then, the light is reflected by the reflector D51 before being irradiated to the front right side of the vehicle body (left lower side in FIG. 5).

In the exemplary embodiment as shown in FIGS. 3 to 5, the end portion of the diffusion plate FA can be curved so that it is directed toward the center of the vehicle (right side in FIGS. 3 to 5). As a result, part of the light d1 that passes through the second focus P2 is refracted when passing through the incident surface (right side surface in FIG. 4) and the emitting surface (left side surface in FIG. 4) of the diffusion plate FA, and is then refracted by the corrugated portion of the diffusion plate FA, to be irradiated to the right side of the vehicle body as refracted light d2' (left side in FIG. 4). In addition to this, another part of the light d1 that passes through the second focus P2 is reflected by the incident surface and the emitting surface of the diffusion plate FA, to be irradiated to the center and front side of the vehicle body as refracted light d2 (lower right side in FIG. 4). Namely, the reflected light d2 is irradiated more leftward than the reflected light c2.

Accordingly, the vehicle light can diffuse the irradiated light as uniformly as possible by curving the end portion of the diffusion plate FA to the center side (right side in FIGS. 3 to 5). That is, the vehicle light of the embodiment can irradiate light in a wider range.

In the exemplary embodiment of FIG. 3, the end portion of the diffusion plate FA is curved moderately, but the disclosed subject matter is not limited thereto. For example, in another exemplary embodiment, the end portion of the diffusion plate FA can be bent acutely. That is, the end portion can be curved with a smaller radius of curvature. As an alternative exemplary embodiment, the end portion of the diffusion plate FA can be bent polygonally. In a further alternative exemplary embodiment, the end portion may be linearly extended without being bent or curved. In this case, the refracted light and the reflected light from the linearly extended diffusion plate FA can be irradiated in the irradiation direction of the vehicle light. Therefore, the light can be diffused more in the irradiation direction as compared with the case where only the refracted light from the diffusion plate FA is irradiated in the irradiation direction.

In the exemplary embodiment as shown in FIG. 4, almost all of the diffused light from the reflector D53 is further diffused by the diffusion plate FA, but the disclosed subject matter is not limited thereto. Alternatively, in another exemplary embodiment, the vehicle light can directly irradiate the diffused light from the reflector D53 in the irradiation direction without the use of diffusion plate FA.

In the exemplary embodiment of FIG. 3, the thickness of the diffusion plate FA may be set to approximately 2 mm to 3 mm. The pitch of the corrugated portion of the plate FA may be set to approximately 3 mm, and the depth of the corrugated portion of the plate FA may be set to approximately 0.5 mm. The disclosed subject matter, however, is not limited thereto. In another exemplary embodiment, the dimensions thereof can be set differently and in accordance with an intended design or specification of the vehicle light.

In the exemplary embodiment of FIG. 3, the emitting surface of the diffusion plate FA (left side surface in FIG. 4) is corrugated, but the disclosed subject matter is not limited thereto. In another exemplary embodiment, alternatively, the incident surface of the diffusion plate FA (right side surface in FIG. 4) may be corrugated. In another exemplary embodiment, both the incident surface and the emitting surface of the diffusion plate FA may be corrugated. In another exemplary embodiment, the diffusion plate FA may not be corrugated. In this case, both the refracted light and the reflected light from the non-corrugated diffusion plate FA are irradiated in the irradiation direction of the vehicle light. Even in this case, the vehicle light can also provide more diffused light in the irradiation direction as compared with the case where only the refracted light form the diffusion plate is irradiated.

In the exemplary embodiment as shown in FIG. 4, the diffusion plate FA is arranged such that the light a1, b1, c1, and d1 can be incident on the incident surface of the diffusion plate FA (right side surface in FIG. 4) with the incident angles θa, θb, θc, and θd of approximately 25° or more. In other words, the diffusion plate FA is arranged such that light a1, b1, c1, and d1 are not incident on the incident surface at the angle θa, θb, θc, and θd of less than 25°. In this manner, prevention of a case in which the light incident on the incident surface at an angle less than 25° is reflected and returned back toward the light source side, which is not effectively utilized for irradiation, can be achieved.

Figure 10:
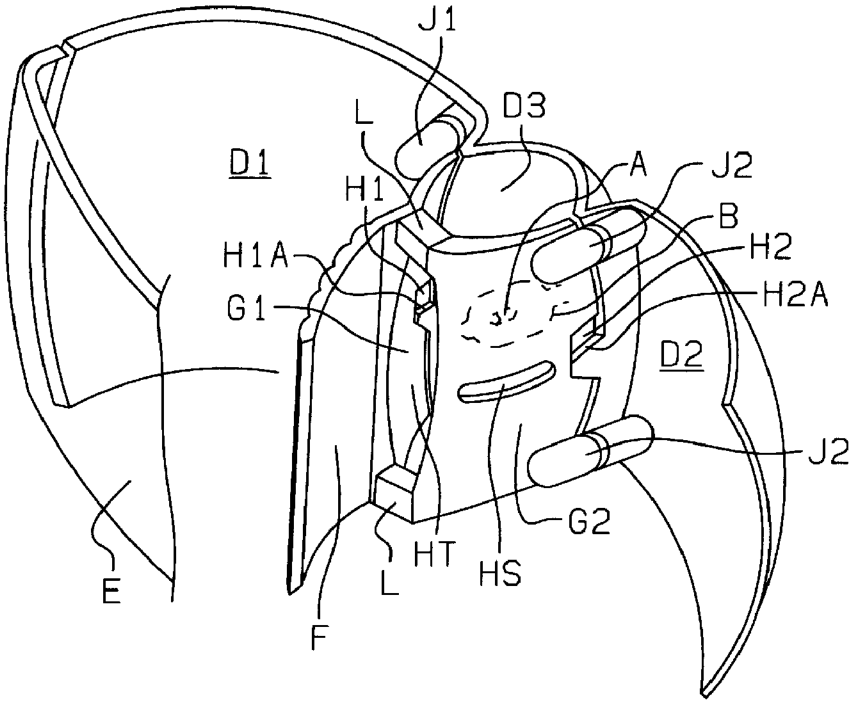
FIG. 10 is a perspective view of another embodiment of a vehicle light made in accordance with principles of the disclosed subject matter.
Figure 11:
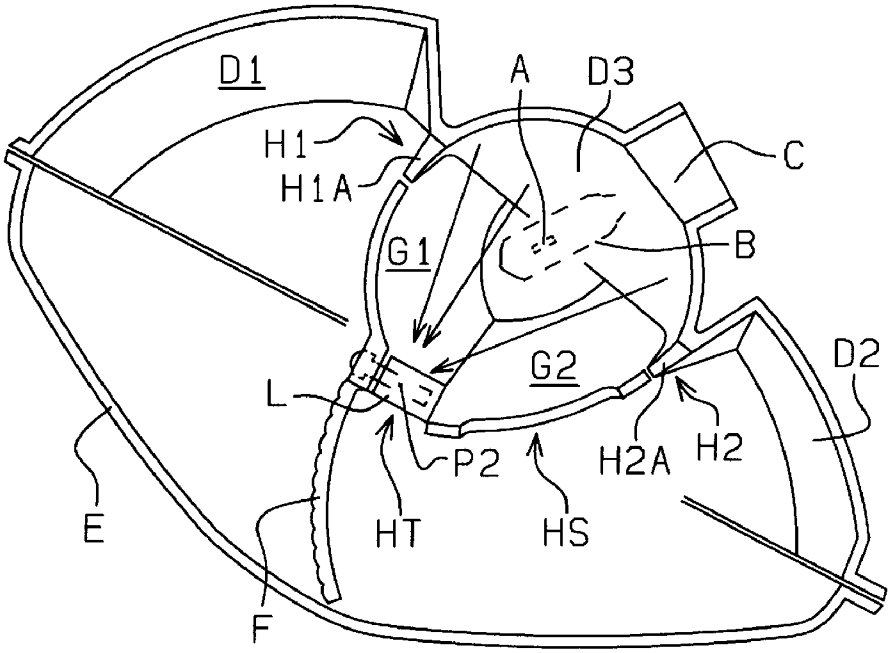
FIG. 11 is a cross-sectional view of the vehicle light of FIG. 10.

A description will now be given of a vehicle light according to another exemplary embodiment of the disclosed subject matter. FIG. 10 shows a perspective view of a vehicle headlight made in accordance with principles of the disclosed subject matter. In particular, FIG. 10 is a view when a vehicle light to be mounted on the right side of the vehicle body is seen from front and above. FIG. 11 is a horizontal cross-sectional view of the vehicle light in accordance with the exemplary embodiment of FIG. 10. In particular, the lower side in FIGS. 10 and 11 corresponds to the front side of a vehicle and the upper side thereof corresponds to the rear side of the vehicle. In addition, the left side thereof corresponds to the right side (right side surface) of the vehicle and the right side thereof corresponds to the left side (center side) of the vehicle. The vehicle light according to the exemplary embodiment shown in FIGS. 10 and 11 is designed to extend from the front surface to the right side face of the vehicle.

In the vehicle light of the exemplary embodiment shown in FIG. 10, the main optical axis (center axis) of the light source A can be directed to the front right side of the vehicle (lower left side in FIG. 11) such that the main optical axis (center axis) of the light source A forms 45°±15° with respect to the front-to-rear direction (up-to-down direction in FIG. 11) of the vehicle.

In FIGS. 10 and 11, symbol C denotes an attachment hole for attaching a socket of light source, and symbol D3 denotes a reflector configured to reflect light emitted from the light source A. The reflector D3 can serve as a reflecting surface as well as a supporting member for supporting the light source A. Symbol D1 denotes a reflector configured to reflect the converged light to the front of the vehicle (lower side in FIG. 11). The reflector D1 is arranged on the right side of the light source A (right side face of the vehicle, also on the left side in FIG. 11). Symbol D2 denotes a reflector configured to reflect the light with a smaller converging degree than the irradiation light from the reflector D1 to the front of the vehicle (lower side in FIG. 11). The reflector D2 is arranged on the left side of the light source A (center side of the vehicle, also on the right side in FIG. 11). The reflectors D1, D2, and D3 can be formed as a single integral member.

Symbol G1 denotes an elliptic reflector configured to reflect the light emitted from the light source A to the reflector D2. Symbol G2 denotes an elliptic reflector configured to reflect the light emitted from the light source A to the reflector D1. The reflector G1 is arranged so that the light source A is located at or in the vicinity of the first focus of the elliptic reflector G1. The reflector G2 is arranged so that the light source A is located at or in the vicinity of the first focus of the elliptic reflector G2. The reflectors D1, D2, and D3, the reflector G1, and the reflector G2 can be formed as separate members. The reflectors D1, D2, and D3 and the reflector G1 are connected with each other by screws or other attachment structures or adhesive means. The reflectors D1, D2, and D3 and the reflector G2 can also be similarly connected. The reflector G1 and the reflector G2 can also be similarly connected with each other.

Symbol H1 denotes a hole formed in the vicinity of the second focus of the elliptic reflector G2 and in the boundary portion between the reflectors D3 and G1. The hole H1 is configured so as to allow the light reflected from the elliptic reflector G2 to reach the reflector D1. Symbol H2 denotes a hole formed in the vicinity of the second focus of the elliptic reflector G1 and in the boundary portion between the reflectors D3 and G2. The hole H2 is configured so as to allow the light reflected from the elliptic reflector G1 to reach the reflector D2. The hole H1 can have a lower edge H1A for forming the cut-off line in the light distribution pattern formed in front of the vehicle by the reflector D1. In addition, the hole H2 can include a lower edge H2A for forming the cut-off line in the light distribution pattern formed in front of the vehicle by the reflector D2. Furthermore, the lower edge H1A of the hole H1 is provided in the reflector D3 (and not in the reflector G1). The lower edge H2A of the hole H2 is provided in the reflector D3 (and not in the reflector G2).

In the exemplary embodiment, the reflector D1 is composed of a complex elliptic surface similar to a revolved parabolic surface, and converges the light that passes through the hole H1 and reflects the light toward the front side of the vehicle (lower side in FIG. 11). The reflector D2 is also composed of a complex elliptic surface similar to a revolved parabolic surface, and converges the light passing through the hole H2 and reflects the light toward the front side of the vehicle (lower side in FIG. 11).

Furthermore, symbol J1 denotes a boss portion serving as a screw (or other attachment structure) accommodating section for accommodating screws (or other connectors) connecting the reflectors D1, D2, and D3 to the reflector G1. Symbol J2 denotes another boss portion serving as a screw (or other attachment structure) accommodating section for accommodating screws (or other attachment structures) connecting the reflectors D1, D2, and D3 to the reflector G2. Symbol L denotes screw (or other attachment structure) accommodating section for accommodating screws (or other attachment structures) connecting the reflector G1 to the reflector G2.

Symbol HS denotes a first through hole formed in the reflector G2 so as to be substantially parallel to the light source A. The hole HS is, for example, a horizontally elongated hole. In the exemplary embodiment shown in FIG. 11, the light source A and the reflector G2 are arranged such that the center axis of the light source A and the horizontal cross-sectional curve of the reflector G2 are substantially parallel to each other. Accordingly, part of the light emitted from the light source A is allowed to pass through the first through hole HS without being reflected so as to be irradiated in front of the vehicle (lower side in FIG. 11). In particular, light that is horizontally emitted from the light source A and light that is slantways and downwardly emitted from the light source A passes through the first through hole HS. Furthermore, the light emitted upward from the light source A is not allowed to pass through the first through hole HS.

Symbol HT denotes a second through hole formed in the boundary portion between the reflector G1 and the reflector G2 so as to allow the reflected light from the reflector D3 to pass therethrough. The second through hole is, for example, a longitudinal hole. In the exemplary embodiment shown in FIG. 11, the horizontal cross section of the reflecting surface of the reflector D3 is depicted as an elliptic arc. The reflector D3 is configured so that the light source A is located at or in the vicinity of the first focus of the elliptic arc and the second through hole HT is located at the second focus P2 thereof. Within the horizontal plane, the light reflected from the reflector D3 is converged on the second focus P2, and then diffused. Furthermore, the reflecting surface of the reflector D3 has an elliptic arc in a vertical cross section similar to a parabola (not shown). The reflector D3 is configured so that the light source A is located at or in the vicinity of the first focus of the elliptic arc and the second focus thereof is located 10 m to 40 m away from the light source A in the forward direction (the lower side in FIG. 11). Namely, the light reflected by the reflector D3 is converged 10 m to 40 m away in front of the light source (lower side in FIG. 11) within the vertical plane.

Symbol F denotes a diffusion plate. The diffusion plate F may be made of, for example, a transparent corrugated plate having a given light transmittance. The diffusion plate F can diffuse the light passing through the second through hole HT, in right and left directions. Alternatively, the diffusion plate F may be made of a translucent plate, or a plate member without lens cut portions formed on the surface. It should be appreciated that in the exemplary embodiment shown in FIG. 11 that the diffusion plate F and the reflector G1 are formed as a single part. In particular, the diffusion plate F and the reflector G1 may be formed of, for example, a transparent resin material, and the inside surface of the reflector G1 can be subjected to an aluminum vapor deposition treatment to complete the elliptic reflector G1. In this manner, the reflector G1 made of a transparent resin material can be applied with vapor deposited aluminum, and the resulting reflector G1, when viewed from outside, is beautiful and neat in appearance due to the thickness of the transparent resin material portion of the reflector G1.

The diffusion plate F can be configured to extend from the right side of the second through hole HT (left side in FIGS. 10 and 11) to the front side of the vehicle (lower side in FIG. 11). In addition to this, the end portion of the diffusion plate F in this embodiment is curved so that it is directed toward the center of the vehicle (right side in FIGS. 10 and 11). As a result, part of the light passing through the second through hole HT is irradiated in front of the vehicle (lower side in FIG. 11) without being incident on the diffusion plate F. Furthermore, the other part of the light passing through the second through hole HT is incident on the incident surface of the diffusion plate F (right side surface in FIG. 11) and emitted through the emitting surface (left side surface in FIG. 11). At that time, the light is refracted to be diffused and irradiated toward the front right side (left lower side in FIG. 11) and right side (left side in FIG. 11) of the vehicle. The remains of the light passing through the second through hole HT is reflected by the incident surface or the emitting surface of the diffusion plate F so as to be irradiated toward the front left side (right lower side in FIG. 11) of the vehicle.

In the exemplary embodiment shown in FIGS. 10 and 11, the end portion of the diffusion plate F is curved so that it is directed toward the center of the vehicle (right side in FIGS. 10 and 11) and the light having passed through the second through hole HT can be captured with ease. As a result, the diffused light which is not incident on the diffusion plate F is mixed with the diffused light reflected by the diffusion plate F, thereby providing widely spread diffusion light.

In the exemplary embodiment shown in FIGS. 10 and 11, not only the light passing through the diffusion plate F but also the light reflected by the diffusion plate F are effectively irradiated toward the front of the vehicle (lower side in FIG. 11) and the side thereof (left side in FIG. 11).

In addition, the diffusion plate F can diffuse the light from the light source A with a wider range of diffusion angles in the right and left direction so as to prevent direct light from the light source A from becoming glare light for a vehicle traveling in an opposite lane. In this configuration, the diffused light with wider diffusion angles can be irradiated sideways with high intensity while the light utilization efficiency from the light source A can be improved.

The light, which is emitted from the light source A and reflected by the elliptic reflector G2 as shown in FIGS. 10 and 11, is converged on the second focus of the elliptic reflector G2 after passing through the hole H1, thereby forming an image of the light source A. Furthermore, the outer periphery of the image of the light source A formed in the vicinity of the second focus of the reflector G2 is cut by the hole H1. In this instance, the lower edge H1A of the hole H1 is formed into a shape of, for example, a broken line or a Z-shaped broken line, and accordingly, the outer periphery of the image of light source A is partly cut. In accordance with the cut shape, the light distribution pattern is formed with a cut-off line via the reflector D1.

The lower edge H1A of the hole H1 for providing the cut-off line in the light distribution pattern is provided in the reflector D3 (and not in the reflector G1). As a result, the manufacturing stability may be improved by suppressing the shift of the actual cut-off line due to manufacturing and/or assembly errors, as described above.

In the same manner, the light, which is emitted from the light source A and reflected by the elliptic reflector G1 as shown in FIGS. 10 and 11, is converged on the second focus of the elliptic reflector G1 after passing through the hole H2, thereby forming an image of the light source A. Furthermore, the outer periphery of the image of the light source A formed in the vicinity of the second focus of the reflector G1 is cut by the hole H2. In this instance, the lower edge H2A of the hole H2 is formed into a shape of, for example, a broken line or a Z-shaped broken line, and accordingly, the outer periphery of the image of light source A is partly cut. In accordance with the cut shape, the light distribution pattern is formed with cut-off line via the reflector D2.

The lower edge H2A of the hole H2 for providing the cut-off line in the light distribution pattern is provided in the reflector D3 (and not in the reflector G2). As a result, manufacturing stability may be improved by suppressing the shift of the actual cut-off line due to manufacturing and/or assembly errors, as described above.

The vehicle headlight in accordance with the exemplary embodiment shown in FIG. 10 can have right-left asymmetry. In particular, as shown in FIGS. 10 and 11, the reflecting surface of the reflector D1 on the right side of the vehicle (left side in FIGS. 10 and 11) is made larger and deeper than that of the reflector D2 on the center side of the vehicle (right side in FIGS. 10 and 11). In other words, the average distance between the second focus of the elliptic reflector G2 and the reflecting surface of the reflector D1 is approximately 1.5 to 2 times as long as the average distance between the second focus of the elliptic reflector G1 and the reflecting surface of the reflector D2. Alternatively, the reflecting surfaces of the reflectors D1 and D2 are formed such that the area of the reflecting surface of the reflector D1 is approximately 2 to 3 times as large as the area of the reflecting surface of the reflector D2. As a result, the reflector D1 which has a relatively large area can form a spot light distribution pattern due to convergence, and at the same time the reflector D2 which has a relatively small area can form a diffused large light distribution pattern (diffused light area).

In the exemplary embodiment shown in FIG. 11, the horizontal cross-sectional curve of the reflecting surface of the reflector G2 is made substantially parallel to the main optical axis of the light source A in order to deliver a larger amount of light from the light source A to the reflector D1. In other words, the light emitted from the light source A can be captured by the reflector G2 more than the reflector G1.

In accordance with this configuration, the vehicle headlight can irradiate light in the right side and front side of the vehicle with light of wider range and diffused by the diffusion plate F. At the same time, the light irradiated in front of the vehicle can be strengthened by the reflector D1 to improve the distance visibility.

Furthermore, the light can be irradiated without reflection. In the exemplary embodiment shown in FIGS. 10 and 11, the first through hole HS is configured to irradiate direct light from the light source A in front of the vehicle (lower side in FIGS. 10 and 11). In comparison with the case where such a through hole is not formed and light reflected by the elliptic reflector G2 is partly cut by the hole H1 and then irradiated in front of the vehicle by the reflector D1, light loss due to the plural reflections may be suppressed and the light utilization efficiency can be improved.

The main optical axis (center axis) of the light source A is directed to the right front side of the vehicle (left lower side in FIG. 11). In this case, the side face of the light source A (cylindrical surface) can be seen via the first through hole HS from the front side of the vehicle (lower side in FIGS. 10 and 11). In particular, as shown in FIG. 11, the light source A, the first through hole HS, and the diffusion plate F are arranged so as not to expose the end portion of the diffusion plate F to the light which is emitted from the light source A and passes through the first through hole HS. In addition, the vertical dimension of the first through hole HS is set so that downward light from the light source A with an angle in a range between approximately 0° and 12° is irradiated through the first through hole HS in front of the vehicle (lower side in FIGS. 10 and 11).

The vehicle headlight can include a diffusion plate F made of a transparent corrugated plate, but the disclosed subject matter is not limited thereto. Instead, the diffusion plate can be made of a translucent plate or a colored transparent plate which can provide a certain transmittance.

As described above, convex portions can be provided in the emitting surface of the diffusion plate F (left side in FIG. 11). However, the disclosed subject matter is not limited thereto. In another exemplary embodiment, convex portions can be provided in the incident surface (right side in FIG. 11) or both the surfaces of the diffusion plate F. Alternatively, concave portions can be provided in one or both of the surfaces of the diffusion plate F (instead of providing the convex portions).

In the exemplary embodiment shown in FIGS. 10 and 11, the diffusion plate F and the reflector G1 are formed as a single unit. The disclosed subject matter, however, is not limited thereto. The diffusion plate F and the reflector G1 may be separately formed.

Figure 12:
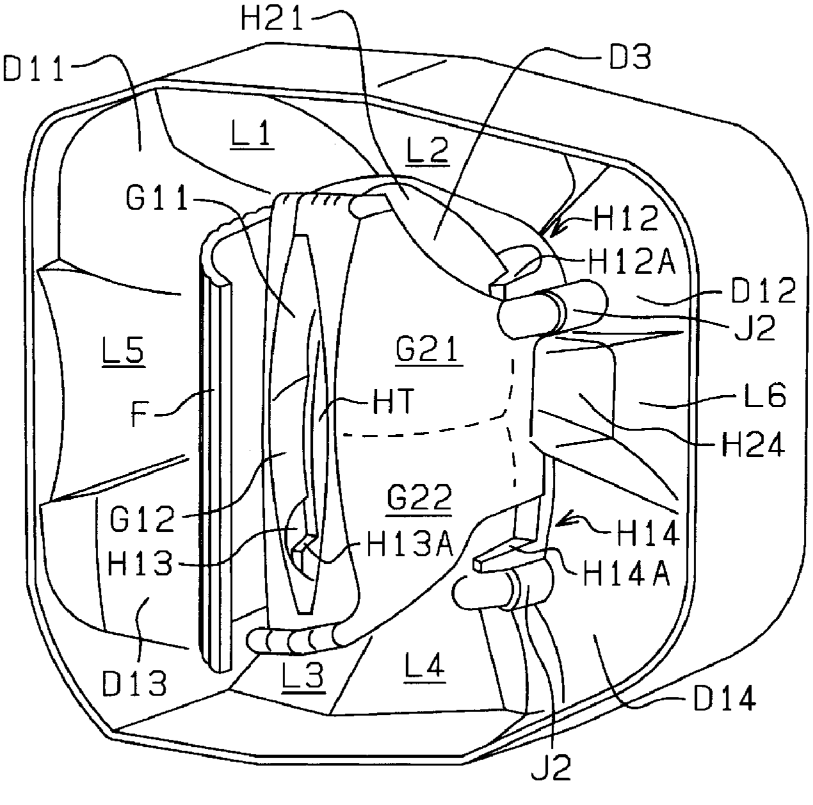
FIG. 12 is a perspective view of another embodiment of a vehicle light made in accordance with principles of the disclosed subject matter.

A description will now be given of the vehicle light according to yet another exemplary embodiment. FIG. 12 shows a perspective view of the vehicle light made in accordance with principles of the disclosed subject matter. In particular, FIG. 12 is a view of a vehicle light that is configured to be mounted on the right side of the vehicle body as seen from front and above. The vehicle headlight has some similar configurations with respect to the exemplary embodiment shown in FIGS. 10 and 11, except for certain features, including the following point. Thus, the same or similar effects can be attained in this embodiment.

In FIG. 12, the same reference symbols and numerals as those used in FIGS. 10 and 11 denote the same or similar parts or portions as shown in FIGS. 10 and 11.

As shown in FIG. 10, the reflector G1 is configured as a single part. In contrast, the vehicle light in accordance with the embodiment shown in FIG. 12 has reflectors G11 and G12 vertically separated as two parts, as compared to the single style reflector G1. Similarly, as shown in FIG. 10, the reflector G2 is configured as a single part. The disclosed subject matter, however, is not limited thereto. The vehicle light in accordance with the exemplary embodiment as shown in FIG. 12 has reflectors G21 and G22 vertically separated as two parts instead of the single part reflector G2.

In the exemplary embodiment shown in FIG. 12, light reflected by the elliptic reflector G21 is allowed to pass through a hole H11 (not shown) which is formed in the boundary portion between the reflectors D3 and G11. Then, the light is reflected by the reflector D11 to be irradiated in front of the vehicle. In addition to this, the light reflected by the elliptic reflector G11 is allowed to pass through a hole H12 which is formed in the boundary portion between the reflectors D3 and G21. Then, the light is reflected by the reflector D12 to be irradiated in front of the vehicle. In addition to this, the light reflected by the elliptic reflector G22 is allowed to pass through a hole H13 which is formed in the boundary portion between the reflectors D3 and G12. Then, the light is reflected by the reflector D13 to be irradiated in front of the vehicle. Furthermore, the light reflected by the elliptic reflector G12 is allowed to pass through a hole H14 which is formed in the boundary portion between the reflectors D3 and G22. Then, the light is reflected by the reflector D14 to be irradiated in front of the vehicle.

In the exemplary embodiment shown in FIG. 12, the lower edge H11A (not shown) of the hole H11 (not shown) for providing a cut-off line in the light distribution pattern formed in front of the vehicle by the reflector D11 is not provided in the reflector G11, but instead is provided in the reflector D3. Furthermore, the lower edge H12A of the hole H12 for providing a cut-off line in the light distribution pattern formed in front of the vehicle by the reflector D12 is not provided in the reflector G21, but in the reflector D3. Furthermore, the lower edge H13A of the hole H13 for providing a cut-off line in the light distribution pattern formed in front of the vehicle by the reflector D13 is not provided in the reflector G12, but in the reflector D3. In addition, the lower edge H14A of the hole H14 for providing a cut-off line in the light distribution pattern formed in front of the vehicle by the reflector D14 is not provided in the reflector G22, but in the reflector D3.

In the exemplary embodiment shown in FIG. 12, part of light emitted from the light source A (not shown) is allowed to pass through the hole 21 formed in the boundary portion between the reflectors G11 and G21. Then, the light is irradiated in the right front direction by the reflector L1 and in the left front direction by the reflector L2. In addition to this, part of light emitted from the light source A (not shown) is allowed to pass through the hole H22 (not shown) formed in the boundary portion between the reflectors G12 and G22. Then, the light is irradiated in the right front direction by the reflector L3 and in the left front direction by the reflector L4. Furthermore, part of light emitted from the light source A (not shown) is allowed to pass through the hole H23 (not shown) formed in the boundary portion between the reflectors G11 and G12. Then, the light is irradiated in the forward direction by the reflector L5. In addition to this, part of light emitted from the light source A (not shown) is allowed to pass through the hole H24 formed in the boundary portion between the reflectors G21 and G22. Then, the light is irradiated in the forward direction by the reflector L6.

In the above-described exemplary embodiment, light which is reflected once by the reflector L1, L2, L3, L4, L5, or L6 is irradiated in the forward direction, thereby reducing loss of light by multiple reflections.

The diffusion plate F in this exemplary embodiment extends from the right side of the second through hole HT (left side in FIG. 12) to the front side of the vehicle (lower side in FIG. 12). In addition to this, the end portion of the diffusion plate F is curved so that it is directed toward the center of the vehicle (right side in FIG. 12). As a result, part of the light passing through the second through hole HT is irradiated in front of the vehicle (lower side in FIG. 12) without being incident on the diffusion plate F. Furthermore, the other part of the light passing through the second through hole HT is incident on the incident surface of the diffusion plate F (right side surface in FIG. 12) and emitted through the emitting surface (left side surface in FIG. 12). At that time, the light is refracted to be diffused and irradiated toward the front right side and right side (left lower side in FIG. 12) of the vehicle. The remains of the light passing through the second through hole HT is reflected by the incident surface or the emitting surface of the diffusion plate F so as to be irradiated toward the front left side (right side in FIG. 12) of the vehicle.

In the exemplary embodiment shown in FIG. 12, the end portion of the diffusion plate F is curved so that it is directed toward the center of the vehicle (right side in FIG. 12) and the light having passed through the second through hole HT can be captured with ease. As a result, the diffused light which is not incident on the diffusion plate F is mixed with the diffused light reflected by the diffusion plate F, thereby providing widely spread diffusion light.

Thus, not only the light passing through the diffusion plate F but also the light reflected by the diffusion plate F are effectively irradiated toward the front of the vehicle (lower side in FIG. 12) and the side thereof (left side in FIG. 12).

The vehicle light according to the exemplary embodiment shown in FIG. 12 can emit diffused light in a wide range in the right and left directions, the light from the light source A being diffused by the diffusion plate F so as to prevent the generation of glare light toward an opposite vehicle. As a result, the light utilization efficiency from the light source A can be increased and irradiation of light diffused by the diffusion plate F can be accomplished in a wider range, toward the side of the vehicle (left side, and right side in FIG. 12).

It should also be noted that the vehicle light can include diffusing means for diffusing and refracting at least a first portion of light received from the light source and for reflecting at least a second portion of light received from the light source, wherein the first portion of light passes through the diffusing means and is irradiated in the emitting direction of the vehicle light, and wherein the second portion of light reflected by the means is diffused and irradiated in the emitting direction of the vehicle light. The diffusing means can include the diffusion plate FA as shown in FIGS. 3-10 or the diffusion plate F as shown in FIGS. 11 and 12. The diffusing means and/or the diffusion plates F and FA can be located within a housing. The housing can include the various reflector(s) that are located about the light source A. An opening (or openings) can be formed by the reflector(s) such that light can be emitted from the vehicle light in an emitting direction of the vehicle light. As shown in FIG. 3, cover lens E is fit into the opening in the housing of the vehicle light. In an alternative embodiment, the housing can be a separate structure located about the light source A and can include the opening through which light is emitted in the emitting direction of the vehicle light. Reflectors can be located within the housing in this alternative embodiment of the vehicle light.

Furthermore, examples of the vehicle light in accordance with the disclosed subject matter include, but are not limited thereto, vehicle headlights, auxiliary headlights, front turn signal lamps, cornering lamps, and other vehicle lights to be mounted on the front face or side face of the vehicle body. Alternative examples thereof include tail lamps, stop lamps, back lamps, and other rear lamps, or spot lamps or other traffic or signal lamps.

While there has been described what are at present considered to be exemplary embodiments of the disclosed subject matter, it will be understood that various modifications may be made thereto, and it is intended that the appended claims cover such modifications as fall within the true spirit and scope of the invention.

What is claimed is:

1. A vehicle light having an emitting direction comprising:

a housing having an opening in the emitting direction of the vehicle light;

a light source located adjacent the housing;

a diffusion plate configured to diffuse light, the diffusion plate being located with respect to the light source and housing such that at least a portion of light received from the light source is refracted by the diffusion plate and such that the refracted light passes through the diffusion plate, is diffused by the diffusion plate, and is irradiated in the emitting direction of the vehicle light, and the diffusion plate is configured such that at least another portion of light received from the light source is reflected by the diffusion plate and the light reflected by the diffusion plate is diffused by the diffusion plate and irradiated in the emitting direction of the vehicle light;

a first reflector configured to reflect light from the light source to the diffusion plate, the first reflector having a horizontal cross-sectional curve which is an elliptic arc having a first focus and a second focus, wherein the light source is located substantially at the first focus, and the second focus is located between the light source and the diffusion plate; and a second reflector having right and left parabolic reflecting surfaces between which the first reflector is interposed, wherein an end portion of the diffusion plate is located at a boundary portion between the first reflector and one of the parabolic reflecting surfaces of the second reflector, and a through hole is formed in the diffusion plate such that light emitted from the light source passes through the through hole to reach at least one of the parabolic reflecting surfaces of the second reflector.

2. The vehicle light according to claim 1, wherein an end portion of the diffusion plate is bent or curved so as to diffuse the light reflected by the diffusion plate.

3. The vehicle light according to claim 1, wherein the diffusion plate has an incident surface and an emitting surface, and the incident surface is corrugated so as to diffuse light reflected by the incident surface of the diffusion plate.

4. The vehicle light according to claim 1, wherein the diffusion plate has an incident surface and an emitting surface, and the emitting surface is corrugated.

5. The vehicle light according to claim 1, wherein the diffusion plate has an incident surface and an emitting surface, and both the incident surface and the emitting surface are corrugated.

6. The vehicle light according to claim 1 further comprising:

a third reflector configured to reflect light emitted from the light source; and a fourth reflector configured to reflect the light reflected by the third reflector in the emitting direction of the vehicle light, wherein the housing is configured to attach to and extend from a front surface to a side face of a vehicle body, and the third reflector includes a third center-side elliptic reflector, which is disposed on a center side of the light source, and a third side-face elliptic reflector, which is disposed on a side-face side of the light source, wherein the third center-side elliptic reflector has a first center-side reflector focus located substantially at the light source, and the third side-face elliptic reflector has a first side-face reflector focus located substantially at the light source, wherein the fourth reflector includes a fourth center-side reflector, which is disposed on the center side of the light source, and a fourth side-face reflector, which is disposed on the side-face side of the light source, and wherein an average distance from a second center-side reflector focus of the third center-side elliptic reflector to a reflecting surface of the fourth side-face reflector is substantially 1.5 to 2 times as long as an average distance from a second side-face reflector focus of the third side-face reflector to a reflecting surface of the fourth center-side reflector.

7. The vehicle light according to claim 6, wherein the fourth center-side reflector and the fourth side-face reflector are configured such that an area of the reflecting surface of the fourth side-face reflector is substantially two to three times as large as an area of the reflecting surface of the fourth center-side reflector.

8. The vehicle light according to claim 6, wherein a light converging power of the fourth side-face reflector is larger than a light converging power of the fourth center-side reflector.

9. The vehicle light according to claim 6, further comprising:

a fifth elliptic reflector configured to reflect light emitted from the light source, the fifth elliptic reflector positioned behind the light source, wherein a first through hole through which light reflected from the fifth elliptic reflector passes to reach the diffusion plate is formed between the third center-side elliptic reflector and the third side-face elliptic reflector.

10. The vehicle light according to claim 6, wherein the diffusion plate and the third side-face elliptic reflector are formed as an integral single unit.

11. The vehicle light according to claim 2, wherein the diffusion plate has an incident surface and an emitting surface, and both the incident surface and the emitting surface are corrugated.

12. The vehicle light according to claim 2, further comprising:

a first reflector configured to reflect light from the light source to the diffusion plate, the first reflector having a horizontal cross-sectional curve which is an elliptic arc having a first focus and a second focus, wherein the light source is located substantially at the first focus, and the second focus is located between the light source and the diffusion plate.

13. The vehicle light according to claim 3, further comprising:

a first reflector configured to reflect light from the light source to the diffusion plate, the first reflector having a horizontal cross-sectional curve which is an elliptic arc having a first focus and a second focus, wherein the light source is located substantially at the first focus, and the second focus is located between the light source and the diffusion plate.

14. The vehicle light according to claim 4, further comprising:

a first reflector configured to reflect light from the light source to the diffusion plate, the first reflector having a horizontal cross-sectional curve which is an elliptic arc having a first focus and a second focus, wherein the light source is located substantially at the first focus, and the second focus is located between the light source and the diffusion plate.

15. The vehicle light according to claim 5, further comprising:

a first reflector configured to reflect light from the light source to the diffusion plate, the first reflector having a horizontal cross-sectional curve which is an elliptic arc having a first focus and a second focus, wherein the light source is located substantially at the first focus, and the second focus is located between the light source and the diffusion plate.

16. The vehicle light according to claim 2 further comprising:

a third reflector configured to reflect light emitted from the light source; and a fourth reflector configured to reflect the light reflected by the third reflector in the emitting direction of the vehicle light, wherein the housing is configured to attach to and extend from a front surface to a side face of a vehicle body, and the third reflector includes a third center-side elliptic reflector, which is disposed on a center side of the light source, and a third side-face elliptic reflector, which is disposed on a side-face side of the light source, wherein the third center-side elliptic reflector has a first center-side reflector focus located substantially at the light source, and the third side-face elliptic reflector has a first side-face reflector focus located substantially at the light source, wherein the fourth reflector includes a fourth center-side reflector, which is disposed on the center side of the light source, and a fourth side-face reflector, which is disposed on the side-face side of the light source, and wherein an average distance from a second center-side reflector focus of the third center-side elliptic reflector to a reflecting surface of the fourth side-face reflector is substantially 1.5 to 2 times as long as an average distance from a second side-face reflector focus of the third side-face reflector to a reflecting surface of the fourth center-side reflector.

17. The vehicle light according to claim 7, wherein a light converging power of the fourth side-face reflector is larger than a light converging power of the fourth center-side reflector.

18. The vehicle light according to claim 7, further comprising:

a fifth elliptic reflector configured to reflect light emitted from the light source, the fifth elliptic reflector positioned behind the light source, wherein a first through hole through which light reflected from the fifth elliptic reflector passes to reach the diffusion plate is formed between the third center-side elliptic reflector and the third side-face elliptic reflector.

19. The vehicle light according to claim 8, further comprising:

a fifth elliptic reflector configured to reflect light emitted from the light source, the fifth elliptic reflector positioned behind the light source, wherein a first through hole through which light reflected from the fifth elliptic reflector passes to reach the diffusion plate is formed between the third center-side elliptic reflector and the third side-face elliptic reflector.

20. The vehicle light according to claim 7, wherein the diffusion plate and the third side-face elliptic reflector are formed as an integral single unit.

21. The vehicle light according to claim 8, wherein the diffusion plate and the third side-face elliptic reflector are formed as an integral single unit.

22. The vehicle light according to claim 9, wherein the diffusion plate and the third side-face elliptic reflector are formed as an integral single unit.

23. A vehicle light having an emitting direction comprising:

a housing having an opening in the emitting direction of the vehicle light;

a light source located adjacent the housing;

a diffusion plate configured to diffuse light, the diffusion plate being located with respect to the light source and housing such that at least a portion of light received from the light source is refracted by the diffusion plate and such that the refracted light passes through the diffusion plate, is diffused by the diffusion plate, and is irradiated in the emitting direction of the vehicle light, the diffusion plate is configured such that at least another portion of light received from the light source is reflected by the diffusion plate and the light reflected by the diffusion plate is diffused by the diffusion plate and irradiated in the emitting direction of the vehicle light;

a first reflector configured to reflect light from the light source to the diffusion plate, the first reflector having a horizontal cross-sectional curve which is an elliptic arc having a first focus and a second focus, wherein the light source is located substantially at the first focus, and the second focus is located between the light source and the diffusion plate; and a second reflector having right and left parabolic reflecting surfaces between which the first reflector is interposed, wherein an end portion of the diffusion plate is located at a boundary portion between the first reflector and one of the parabolic reflecting surfaces of the second reflector, and a through hole is formed in the diffusion plate such that light emitted from the light source passes through the through hole to reach at least one of the parabolic reflecting surfaces of the second reflector.

* * * * *